Dec. 20, 1955  R. W. BISHOP  2,727,845
METHOD OF MAKING A MOLDED FRICTION LINING
AND BONDING SAME TO A BRAKE SHOE
Original Filed April 21, 1951  2 Sheets-Sheet 1

INVENTOR.
Robert W. Bishop
BY
His Attorney

Dec. 20, 1955    R. W. BISHOP    2,727,845
METHOD OF MAKING A MOLDED FRICTION LINING
AND BONDING SAME TO A BRAKE SHOE
Original Filed April 21, 1951    2 Sheets-Sheet 2

INVENTOR.
Robert W. Bishop
BY
*Willets Hardman & Th*
His Attorney

United States Patent Office 2,727,845
Patented Dec. 20, 1955

2,727,845

METHOD OF MAKING A MOLDED FRICTION LINING AND BONDING SAME TO A BRAKE SHOE

Robert W. Bishop, Fairfield, Iowa, assignor to General Motors Corporation, Detroit, Mich., a corporation of Delaware Original application April 21, 1951, Serial No. 222,243. Divided and this application September 16, 1953, Serial No. 383,100

2 Claims. (Cl. 154—81)

This invention relates to molded segmental brake linings and a method of making same.

An object of this invention is to provide an improved integral brake lining but having segmental braking surfaces, adapted for use on automotive vehicles, and an economical and efficient method of making same.

This application is a division of application Serial No. 222,243, filed April 21, 1951.

The braking surface of the integral brake lining of this invention is provided with a series of intermittently arranged high areas which engage the rotating brake drum when the brakes are applied and perform the braking effort. These high areas preferably extend the full width of the lining and are spaced apart by transversely extending low areas of substantial size which do not engage the brake drum and perform no braking effort, hence no heat is generated in these low areas by friction. These low areas are integral with said high areas and serve to effectively conduct the heat generated in the high areas to the metal surface of the brake shoe to which the brake lining is bonded or otherwise fixed in good heat-conducting relation. Thus it is seen that the full area of the inside surface of the brake lining is utilized to conduct heat from the lining to the metal brake shoe. These low areas provide distributed relatively cool portions in the integral lining and thus provide a more uniform heating up and cooling off of the high areas in use. The net effect of this construction is to provide a more consistently uniform heating up and cooling off of the braking surface lining, and consequently to improve the operating friction characteristics of the brakes. The chief common undesired friction characteristics in present-day molded brake linings are (1) a temporary reduction or "fade out" of the coefficient of friction due to a relatively large temperature rise in the braking surface and (2) a subsequent irregular or erratic recovery of the coefficient of friction to or above its original value upon subsequent cooling. Obviously any non-uniform or erratic variation or "over recovery" in the braking coefficient will be confusing to the driver of the automotive vehicle and seriously affects safe driving. A general object of this invention is to provide a brake lining which minimizes the above mentioned undesired characteristics.

Further objects and advantages of the present invention will be apparent from the following description, reference being had to the accompanying drawings wherein a preferred embodiment of the present invention is clearly shown, and wherein:

Fig. 1 is a side elevation of a brake lining bonded to a metal brake shoe, made according to this invention.

Figs. 2 to 5 inclusive illustrate a method of manufacture of the brake lining according to this invention.

In the drawings similar reference characters refer to similar parts throughout the several views.

Figure 3:
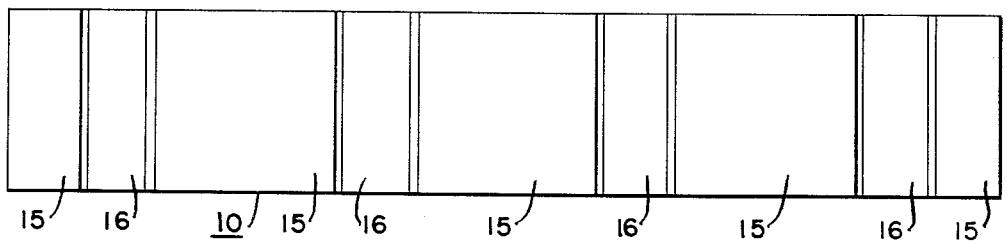
Fig. 3 is a top view of Fig. 2.

Reference numeral 10 designates a straight partially cured blank for making one lining member. The movable friction compound used in blank 10 may be any suitable and well-known compound for this purpose. Such friction compounds commonly contain asbestos fiber, heat-resisting friction powders, phenol-formaldehyde resin or other well-known thermosetting resins, rubber, sulphur, and various filler materials, or various combinations of these ingredients. Such plastic compounds may be readily molded to shape and then cured under heat and pressure to various degrees of hardness and rigidity, all in a well-known manner.

Figure 2:
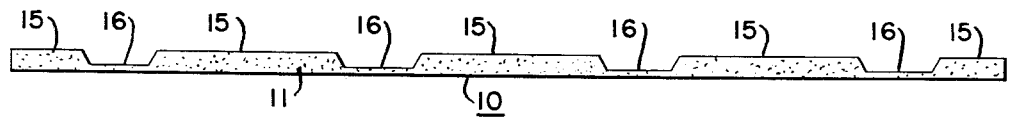
Fig. 2 is a side elevation of an individual partially-cured lining blank as it is originally made in substantially straight form.
Figure 1:
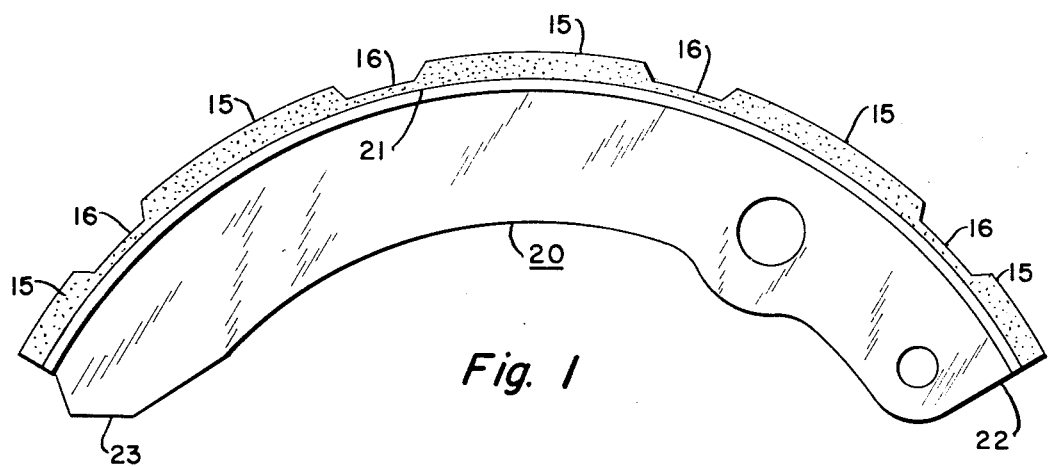

Now according to this invention the blank 10 is first molded from such a friction compound to the section shown in Fig. 2 having a smooth flat lower surface 11 and having alternate high and low areas on its irregular upper surface. In the form shown in the drawings, the high rectangular areas 15 extend directly across the width of the elongated blank 10 and are spaced apart by the low areas 16. Preferably a wide slab of sufficient width to make a plurality of blanks 10 is extruded and then molded to the section shown in Fig. 2 and partially cured to the desired degree of hardness under heat and pressure in a press between a flat lower plate and a correspondingly recessed upper plate. Thereafter the individual blanks 10 are cut from the partially cured wide slab by any suitable means by cuts extending crosswise the low and high areas thereof.

Figure 4:
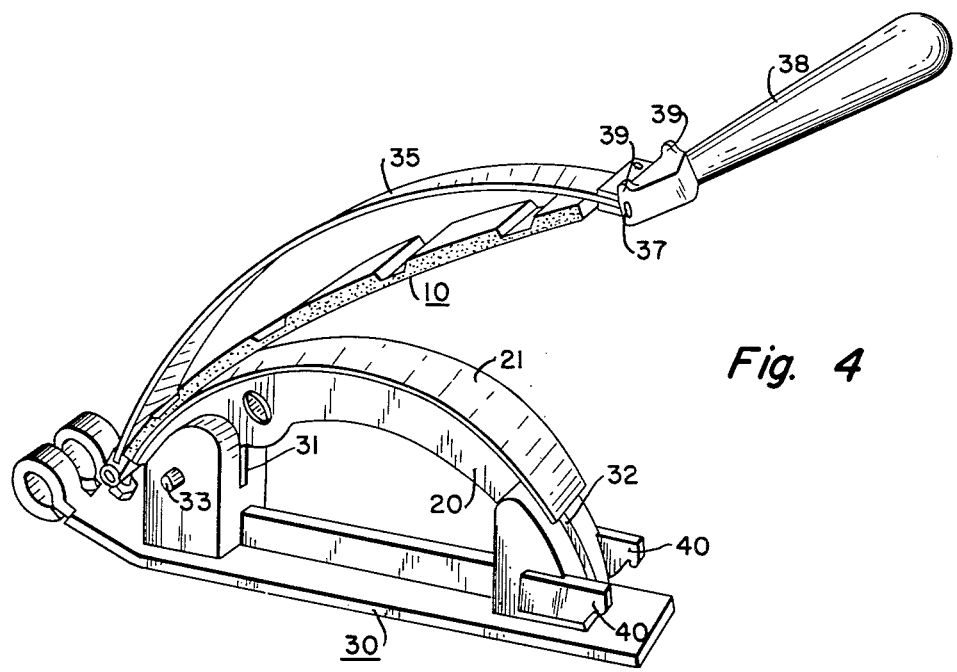
Figs. 4 and 5 illustrate how the straight partially cured blank of Figs. 2 and 3 is bent into its final curved form, Fig. 4 showing the initial position of the parts and Fig. 5 showing the final position of the parts.
Figure 5:
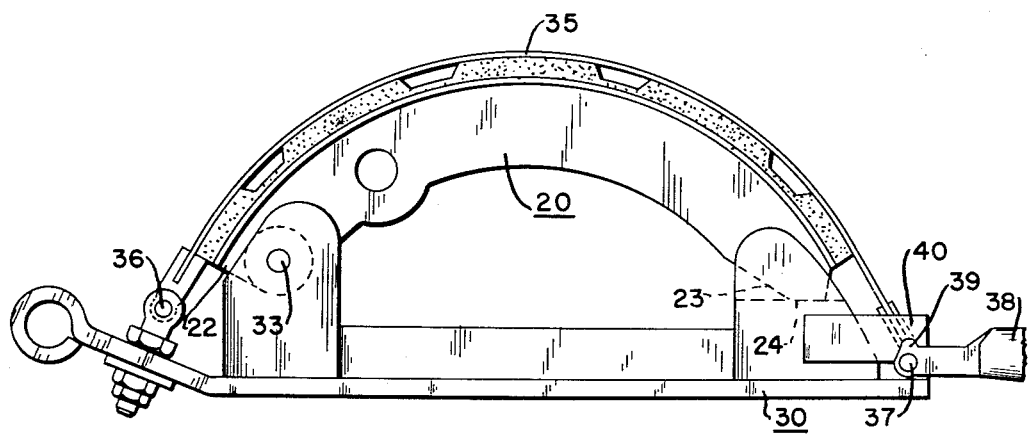

The degree of partial curing of blanks 10 while in the mold should be sufficient to determine the final thickness of and provide substantial strength and rigidity to the relatively thin portions 16 of the blank (and of course still greater strength and rigidity to the relatively thick portions 15 thereof) yet still leave the blank 10 sufficiently flexible to be bent into the desired final curved form, as by the means shown in Figs. 4 and 5. Typical curing conditions to provide such desired degree of partial cure of a slab from which automobile brake linings are to be made are about 15 minutes at 280° F. with a pressure of 1300 lbs. per sq. inch on the material of the slab.

The partially cured individual blanks 10 may be bent around and bonded to the individual metal brake shoes 20 as follows: The convex outer face 21 of the brake shoe 20 is cleaned and preferably finely roughened as by sand blasting, and then coated with a suitable coating of phenalformaldehyde resin in A stage, or other suitable thermosetting resin. Brake shoe 20 is then set within suitable slots 31 and 32 of a portable baking form 30 as clearly shown in Figs. 4 and 5. A through pin 33 accurately locates one end 22 of shoe 20 in slot 31 and the other end 23 of brake shoe 20 rests upon abutment 24 within slot 32. The blank 10 is warmed to a temperature of around 300° F. in order to render it more flexible and is then bent around and clamped upon the resin-coated convex face 21 of the shoe by means of the overlying flexible spring steel band 35. Steel band 35 hinges upon pin 36 at one end thereof and at its opposite end is hinged at pin 37 to handle 38. When the parts are in the position shown in Fig. 4 handle 38 is forced down by hand until the two projecting lugs 39 thereon can be hooked under their stationary cooperating notches 40, after which handle 38 is swung downwardly from a substantially vertical position to the horizontal position shown in Fig. 5. Thus the steel band 35 is put under high tension by the leverage action of lugs 39 fulcruming in their stationary notches 40, and tightly clamps the brake lining down upon the brake shoe surface 21. If so desired, the straight blank 10 may be first bent into its approximate final curvature by any suitable means (such as a special bending mold) before the lining is set upon the convex surface 21 of the brake shoe. The portable baking form 30, containing the brake lining tightly clamped upon the brake shoe 20, is then baked in an oven to complete the cure of the lining material and simultaneously cure the bonding resin coating on surface 21 of the brake shoe and so strongly bond the lining over the entire contacting surface of the shoe. Typical curing conditions for such final baking operation are three hours baking at 400° F.

The above described portable baking fixture has been used heretofore in making plain-surfaced brake linings and therefore this apparatus per se constitutes no part of this present invention.

Operation under normal conditions.

When the brake linings of this invention are used in an automotive vehicle, the thick portions 15 of course do all the braking work and hence heat is generated only in said thick portions. The thin portions 16 of the lining normally remain relatively cool when the thick portions 15 heat up and so serve as cool portions spaced along the length of the lining. These relatively cool portions 16 aid materially in conducting heat away from the heated portions 15 and hence reduce both the rate and degree of temperature rise in portions 15 during normal application of the brakes. Thin portions 16 tend to remain relatively cool since their heat is more quickly dissipated by conduction to the metal brake shoe and to some extent by air circulating in the open spaces above portions 16. By thus lessening both the rate and degree of temperature rise in portions 15 the degree of "fade out" or reduction in the coefficient of friction of portions 15 is materially reduced.

Operation under abnormal conditions.

Now assume that portions 15 have nevertheless been heated to such a high temperature as to cause a substantial "fade out" (such as may be caused by descending a mountain). Such a rigorous application of the brakes will necessarily also heat the thin portions 16 to an unusually high temperature. When such rigorous application is ended (say at the bottom of the descent) portions 15 will begin to cool off and recover from said substantial "fade out." If such cooling off is too rapid or not uniform from time to time the recovery characteristics of the coefficient of friction of the brakes tend to vary in such an erratic manner as to be confusing to the driver. With the linings of this invention the heated thin portions 16 serve to effectively prevent such too rapid rate of cooling of portions 15, such as would occur under the above mentioned conditions if portions 16 be omitted entirely.

The thickness of portions 16 is preferably from one half to one third of the thickness of portions 15.

While the embodiment of the present invention as herein disclosed, constitutes a preferred form, it is to be understood that other forms might be adopted.

What is claimed is as follows:

1. The steps in the method of making a molded friction lining in curved cylindrical shape and bonded directly to a brake shoe, comprising: molding a thermosetting fibrous friction compound into a substantially straight slab having a uniform flat surface on one face thereof and having on its opposite face a series of spaced depressed areas and high areas, partially curing said straight slab under heat and pressure, cutting the partially cured straight slab into elongated one-piece brake lining blanks in such direction that said depressed areas extend across each of said blanks, bending each of the partially cured blanks lengthwise into arcuate form around a cylindrical metal surface so that the spaced high areas of the blank project radially outwardly and tightly clamping said blank throughout its full radial extent thereupon by an overlying flexible metal band which presses upon only said spaced high areas of said blank, then completing the cure of said lining under heat while simultaneously bonding said lining to said metal surface.

2. The steps in the method of making a molded friction lining in curved cylindrical shape and bonded directly to a brake shoe, comprising: molding a thermosetting fibrous friction compound into a substantially straight slab having a substantially even surface on one face thereof and an irregular surface on the opposite face thereof comprising a series of spaced depressed areas and high areas, partially curing said slab to such a degree of cure as will substantially determine the final thickness of said high areas but will still permit said blank to be bent into the curvature of the final brake lining, cutting said slab into elongated individual brake lining blanks, bending each of the elongated partially cured blanks lengthwise into its final arcuate form around a cylindrical metal surface so that the spaced high areas of the blank project radially outwardly and tightly clamping said blank throughout its full radial extent thereupon by an overlying flexible metal band which presses upon only said spaced high areas of said blank, then completing the cure of said lining under heat while simultaneously bonding said lining to said metal surface.

References Cited in the file of this patent

UNITED STATES PATENTS

| Number | Name | Date |
|---|---|---|
| 1,738,291 | Gatke | Dec. 3, 1929 |
| 2,272,532 | Shriver | Feb. 10, 1942 |
| 2,293,914 | Nanfeldt | Aug. 25, 1942 |